United States Patent [19]
Dunn

[11] Patent Number: 5,313,835
[45] Date of Patent: May 24, 1994

[54] INTEGRATED MONOLITHIC GYROSCOPES/ACCELEROMETERS WITH LOGIC CIRCUITS

[75] Inventor: William C. Dunn, Mesa, Ariz.

[73] Assignee: Motorola, Inc., Schaumburg, Ill.

[21] Appl. No.: 810,045

[22] Filed: Dec. 19, 1991

[51] Int. Cl.⁵ .................................................. G01P 9/04
[52] U.S. Cl. .............................. 73/505; 73/517 AV; 73/517 R
[58] Field of Search .................. 364/453; 357/26; 73/504, 505, 510, 652, 517 AV, 517 B, 517 A, 517 R; 257/417

[56] References Cited

U.S. PATENT DOCUMENTS

| | | | |
|---|---|---|---|
| 4,598,585 | 7/1986 | Boxenhorn | 73/505 |
| 4,699,006 | 10/1987 | Boxenhorn | 73/517 AV |
| 4,884,446 | 12/1989 | Ljung | 73/505 |
| 4,891,982 | 1/1990 | Norling | 73/517 R X |
| 4,891,984 | 1/1990 | Fujii et al. | 73/517 R X |
| 4,922,756 | 5/1990 | Henrion | 73/517 R |
| 5,016,072 | 5/1991 | Greiff | 73/504 X |
| 5,060,526 | 10/1991 | Barth et al. | 73/517 AU X |
| 5,092,174 | 3/1992 | Reidemeister et al. | 73/517 R X |
| 5,115,291 | 5/1992 | Stokes | 73/517 AV X |
| 5,121,180 | 6/1992 | Beringhause et al. | 73/517 AV X |

*Primary Examiner*—Tod R. Swann
*Attorney, Agent, or Firm*—Eugene A. Parsons

[57] ABSTRACT

A multi-axes gyroscope, a single axis gyroscope and a three axis accelerometer are formed on a single semiconductor substrate, along with and MPU. The gyroscopes provide sensing for rotation about three mutually orthogonal axes and the accelerometer provides sensing of acceleration along the three axes. The MPU controls and drives the gyroscopes and accelerometer and provides a continuous indication of position.

11 Claims, 13 Drawing Sheets

INTEGRATED MONOLITHIC GYROSCOPES/ACCELEROMETERS WITH LOGIC CIRCUITS

The present invention pertains to new and improved three axis reference systems and/or inertial guidance systems.

BACKGROUND OF THE INVENTION

In the past, gyroscopes and gyroscopic devices were constructed of relatively large and expensive electromagnetic devices. These electromagnetic devices incorporated coils and position sensors mounted for relatively high speed, continuous rotational movement.

Eventually, micromechanical rate gyros were developed which included components formed by semiconductor processing techniques. While these devices are relatively small and utilize vibrational motion rather than continuous rotary motion, they are relatively insensitive and costly to manufacture.

Generally, the micromechanical rate gyros are constructed with a central mass, which because of the size of the gyro is very small and requires some very heavy material such as gold to provide sufficient mass. The central mass is mounted in a gimbal structure including mutually orthogonal flexible axes, with the mass and gimbal structure generally lying in a common plane. The central mass and inner mounting gimbal are oscillated or vibrated about a first of the orthogonal axes and rotational movement about an axis perpendicular to the common plane produces vibrational movement about the other of the orthogonal axes, due to the Coriolis, or gyroscopic, effect.

The described micromechanical rate gyro has several problems. Specifically, the centrally mounted mass is expensive and difficult to manufacture. It is difficult to achieve a large enough mass to provide sufficient inertia for good sensitivity and this construction reduces sensing capacitor sensitivity by increasing the distance between capacitive plates. Also, if the mass is offset even slightly within the gimballed mounting a noticeable sensitivity to cross-axis acceleration is produced. Second, the amount of vibrational movement is limited by the fact that the planar constructed gimbal system is mounted adjacent to a planar surface and increasing the distance between the gimbal system and the planar surface substantially increases the size of the device, which reduces sensitivity, due to increased capacitor spacing as well as increasing the cost and complexity of construction. Further, by constructing the device so that the input axis is perpendicular to the common plane, the device is limited to a single axis device. Since the device only senses movement about a single axis, three of the devices must be mounted with the input axes in a mutually orthogonal relationship to sense movement in all directions.

In attempts to reduce the size and cost of accelerometers, some of the prior art devices have been constructed using semiconductor manufacturing techniques. These devices generally consist of a plate, formed of metal or the like, which is mounted for pivotal movement on a substrate. The plate is positioned parallel to a planar surface of the substrate and forms one or more capacitances therewith. When the plate moves, due to an acceleration force thereon, the capacitances change. This change is sensed by connected electronic circuits and converted to a signal representative of the acceleration.

Gyroscopes and accelerometers are useful in inertial guidance packages to sense movement, or acceleration, of a vehicle in all directions. From this information the position of the vehicle can be determined at all times. Gyroscopes and accelerometers, such as those described above, are manufactured as a single axis device. To obtain an indication of movement in all directions, three of the prior art gyroscopes and/or accelerometers must be positioned so that the sensitive axes are mutually orthogonal. This means that the final package is still relatively large since one or more of the gyroscopes and/or accelerometers must be positioned at an angle to the others and the entire package can never be formed as a single planar package. Further, since each gyroscope and/or accelerometer is constructed on a separate semiconductor substrate, signals must be communicated between chips and, it is a well known fact, that large amounts of power are required to amplify, buffer and communicate signals between chips and noise is induced which reduces the sensitivity of the system.

SUMMARY OF THE INVENTION

It is a purpose of the present invention to provide a new and improved inertial guidance system.

It is a further purpose of the present invention to provide a new and improved inertial guidance system which is simple, inexpensive reproducible and batch manufacturable.

It is a further purpose of the present invention to provide an inertial guidance system which is extremely small, compact and sensitive.

These and other purposes and advantages are realized in an inertial guidance system including gyroscopic apparatus providing gyroscopic outputs about three mutually orthogonal axes, the apparatus being formed on a semiconductor substrate, and control circuitry formed on the same semiconductor substrate and electrically connected to the gyroscopic apparatus for controlling the gyroscopic apparatus and receiving the gyroscopic outputs.

These and other purposes and advantages are further realized in an inertial guidance system including acceleration sensing apparatus providing acceleration outputs along three mutually orthogonal axes, the apparatus being formed on a semiconductor substrate, and control circuitry formed on the same semiconductor substrate and electrically connected to the acceleration sensing apparatus for controlling the acceleration apparatus and receiving the acceleration outputs.

BRIEF DESCRIPTION OF THE DRAWINGS

Referring to the drawings.

DESCRIPTION OF THE PREFERRED EMBODIMENT

Figure 1:
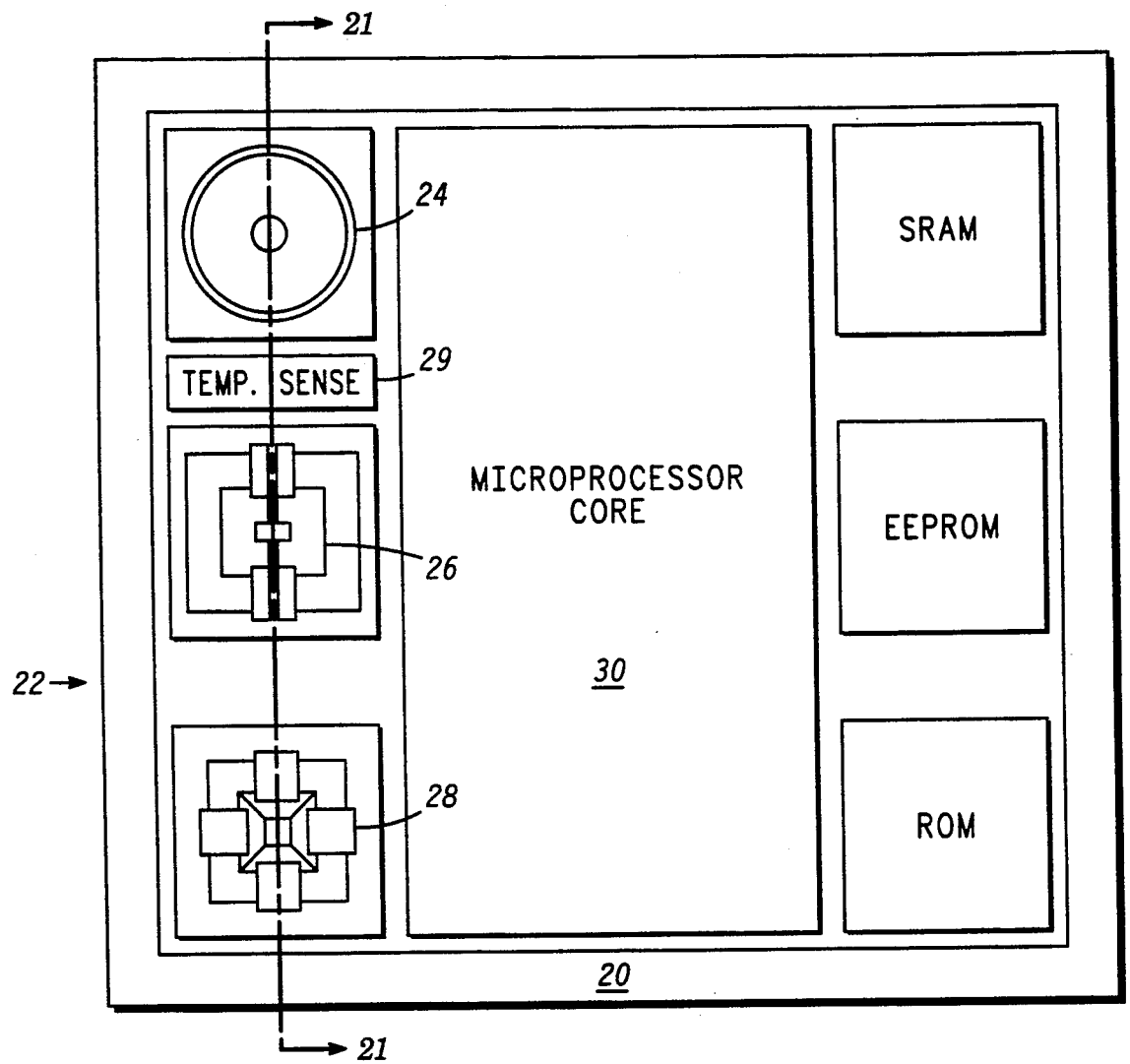
FIG. 1 is a view in top plan of a semiconductor chip having formed thereon an inertial guidance system in accordance with the present invention and including a two axis rotational vibration gyroscope, a single axis vibration monolithic gyroscope, a three axes accelerometer and an MPU.

Referring specifically to FIG. 1, a view in top plan is illustrated of a semiconductor chip 20 having formed thereon an inertial guidance system 22 in accordance with the present invention. Inertial guidance system 22 includes a two axes gyroscope 24, a single axis gyroscope 26, a three axes accelerometer 28, a temperature sensing circuit 29 and an MPU 30. It should be understood that each of the gyroscopes 24 and 26 and the accelerometer 28 are constructed so as to be approximately forty mils on a side. Further, MPU 30 is approximately 180 mils on a side so that the view illustrated appears to be the most advantageous, although many different configurations are possible.

Two axes gyroscope 24 is disclosed in more detail in a copending patent application entitled ROTATIONAL VIBRATION GYROSCOPE, filed of even date herewith and assigned to the same assignee. Single axis gyroscope 26 is disclosed in more detail in a copending patent application entitled VIBRATION MONOLITHIC GYROSCOPE, filed of even date herewith and assigned to the same assignee. Another embodiment of a multi-axes and/or a single axis gyroscope which might be incorporated into the present structure is disclosed in a copending patent application entitled MULTI-AXES GYROSCOPE, filed of even date herewith and assigned to the same assignee. Three axes accelerometer 28 is disclosed in more detail in a copending patent application entitled 3 AXES ACCELEROMETER, filed of even date herewith and assigned to the same assignee. All three of the above identified patent applications are incorporated herein by reference.

Figure 2:
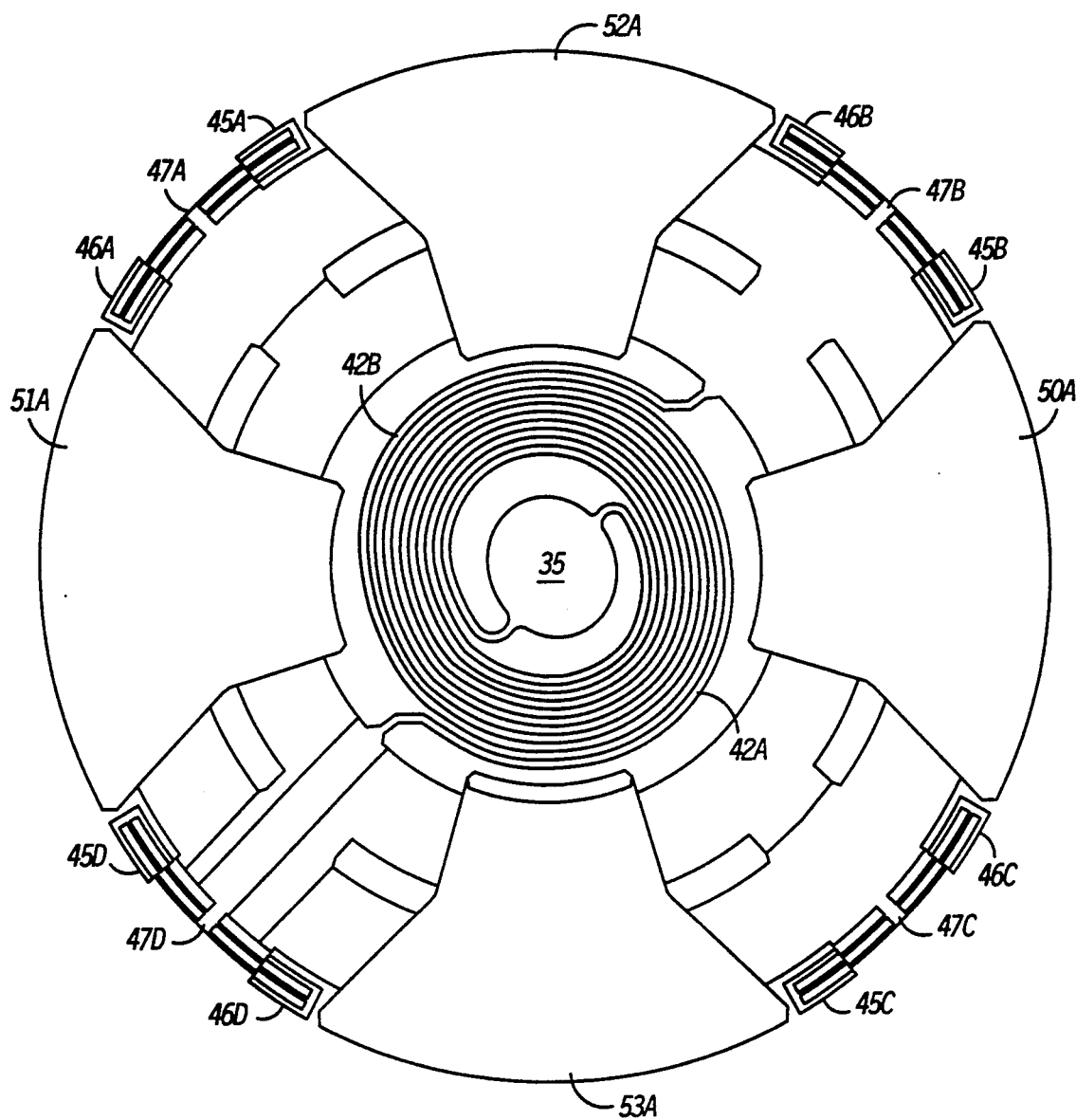
FIG. 2 is an enlarged view in top plan of the two axis rotational vibration gyroscope of FIG. 1.

Referring specifically to FIG. 2, rotational vibration gyroscope 24 is illustrated in an enlarged view in top plan. Gyroscope 24 includes a generally disk shaped rotor 32 having a central opening therethrough. A centrally located mounting post 35 is affixed to a planar surface of substrate 20 so as to be perpendicular thereto. Rotor 32 is rotatably attached to post 35 by means of a plurality, in this specific embodiment two, of helical springs 42A and 42B. Each of the helical springs 42A and 42B are fixedly attached to post 35 at one end and to the inner edge of rotor 32 at the other end. Helical springs 42A and 42B are designed to maintain rotor 32 in a plane parallel to the planar surface of substrate 20 while allowing limited rotational vibration, or oscillatory movement, about post 35.

A plurality of driving elements 45A through 45D and 46A through 46D are positioned in spaced apart relationship about the outer edge of rotor 32. Each of the driving elements 45A through 45D and 46A through 46D includes small plates (fingers) positioned adjacent to and interdigitated with similar plates 47A through 47D attached to rotor 32. All of the elements are also in the same plain as rotor 32. The plates 45A through 45D are electrically connected, as are plates 46A through 46D. By alternately pulsing plates 45A-45D and plates 46A-46D, the electrostatic attraction between plates 45A-45D and 47A-47D, and similarly between 46A-46D and 47A-47D, produces an oscillatory or rotational vibration in rotor 32. The driving elements are in diametrically opposed positions to produce uniform rotation about post 35. The oscillatory frequency produced is the resonant frequency of the structure and is controlled in amplitude.

A plurality of capacitive plates 50A, 51A, 52A and 53A are positioned in spaced apart overlying relationship to the upper major surface of rotor 32 to form four capacitors in conjunction with rotor 32. Four similarly shaped plates 50B through 53B are similarly positioned relative to the lower surface of rotor 32. Capacitive plates 50B through 53B form four capacitors in conjunction with the opposite major surface of rotor 32. The capacitors formed by capacitive plates 50A through 53A and 50B through 53B are sensing capacitors which are used to sense movement of rotor 32 out of the plane of rotation, and to restore rotor 32 to its plane of rotation and in so doing measure the force acting on the rotor.

In the embodiment illustrated in FIG. 2, rotor 32 is rotated about the Z axis by elements 45A-45D and 46A-46D. Capacitive plates 50A-50B and 51A-51B are symmetrically positioned relative to the X axis and capacitive plates 52A-52B and 53A-53B are symmetrically positioned relative to the Y axis. Any rotary motion of gyroscope 24 about the X axis causes movement of rotor 32 about the Y axis, due to the Coriolis, or gyroscopic, effect, which movement is sensed by changes in capacitance between capacitive plates 50A, 50B, 51A, 51B and rotor 32. Similarly, any rotary motion of gyroscope 24 about the Y axis causes movement of rotor 32 about the X axis, which movement is sensed by changes in capacitance between capacitive plates 52A, 52B, 53A, 53B, and rotor 32.

Figure 3:
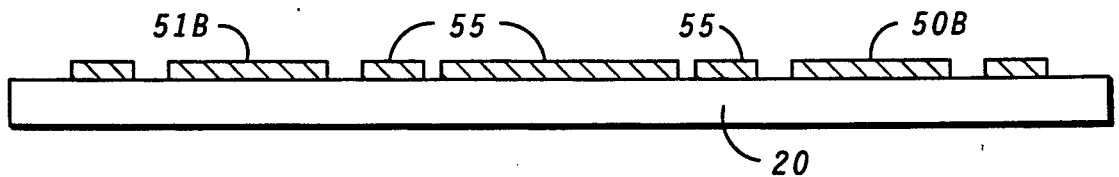
FIGS. 3-8 are sectional views illustrating various steps in a process for constructing the two axis rotational vibration gyroscope of FIG. 2.
Figure 4:
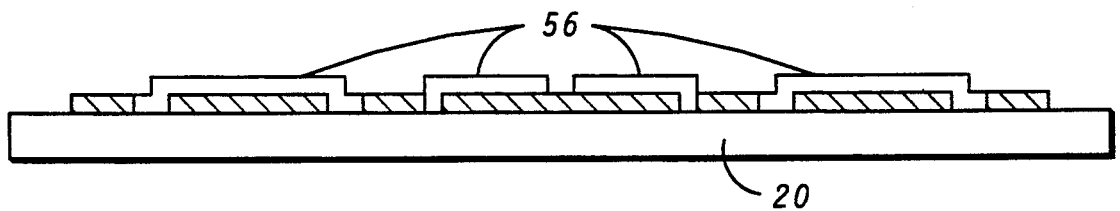

Referring specifically to FIG. 3 through FIG. 8, steps for manufacturing rotational vibration gyroscope 24 are illustrated. FIG. 3 illustrates substrate 20 having a planar surface with an insulating layer on the surface, such as silicon nitride, and with capacitive plates 50B and 51B selectively deposited thereon. Capacitive plates 50B and 51B are formed of any convenient conducting-/semiconducting material, such as metal, highly doped polysilicon, or the like. Spacers 55 are also selectively deposited in the same convenient material as the capacitive plates. The entire structure is then covered with an easily etched layer 56, of material generally referred to as a sacrificial material, as seen in FIG. 4. Layer 56 is formed of material that can easily be removed with no substantial effect on the remaining components, an example of which is phosphosilicate glass (PSG). Layer 56 is then selectively etched to expose spacers 55.

Figure 5:
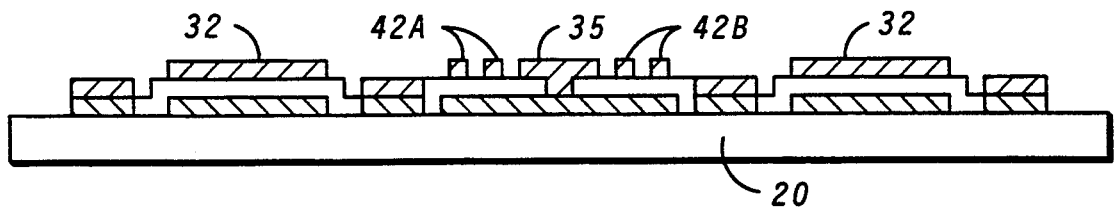
Figure 6:
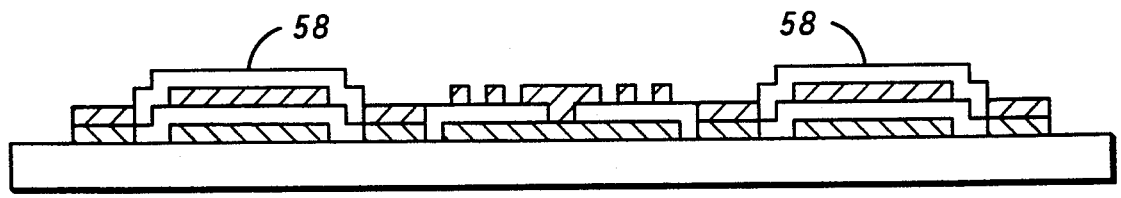

Referring to FIG. 5, a layer of material, such as polysilicon is selectively deposited to form central post 35, helical springs 42A and 42B and rotor 32. It should be noted that layer 55 is extended beyond post 35 so that it acts as an electrostatic screen between springs 42A and 42B and substrate 20. Rotor 32 is highly doped so that it is sufficiently conductive to form capacitors with the upper and lower capacitive plates. Another layer 58 of sacrificial material is selectively deposited over the polysilicon covering rotor 32, as illustrated in FIG. 6. Layer 58 is formed of the same material as layer 56 so that they can both be removed simultaneously.

Figure 7:
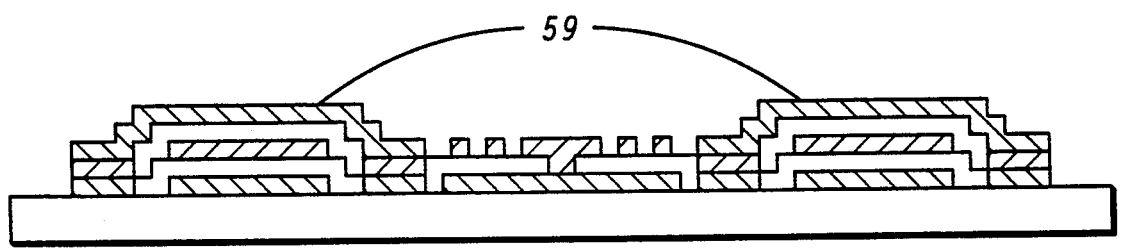
Figure 8:
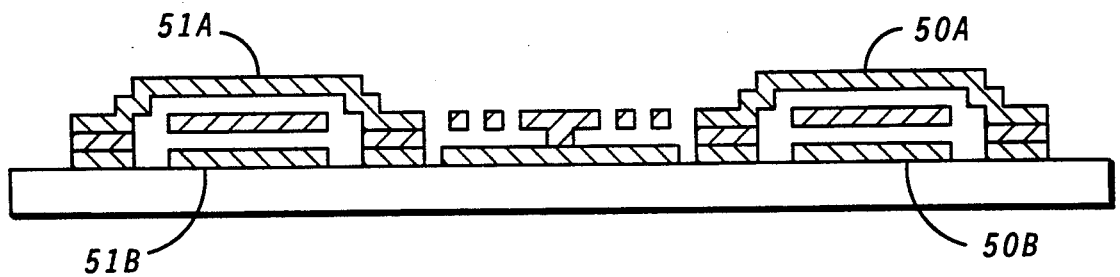

Referring to FIG. 7, layer 59, which is the same material as layers 55, 32, 35, etc., is selectively deposited on the structure. Layer 59 is utilized to form upper capacitive plates 50A and 51A, as illustrated in FIG. 8. Sacrificial layers 56 and 58 are then removed by some convenient method, such as plasma or wet etch, and the gyroscope 24 is completed. It will of course be understood by those skilled in the art that many other methods of forming gyroscope 24 may be utilized and the present described method is only one example. Also, many other surface micromachining types of materials may be utilized and the described materials are for example only. It is also possible to bulk micromachine such a structure in silicon, with wafer bonding techniques used for the assembly of the upper, lower and rotational plates.

Figure 9:
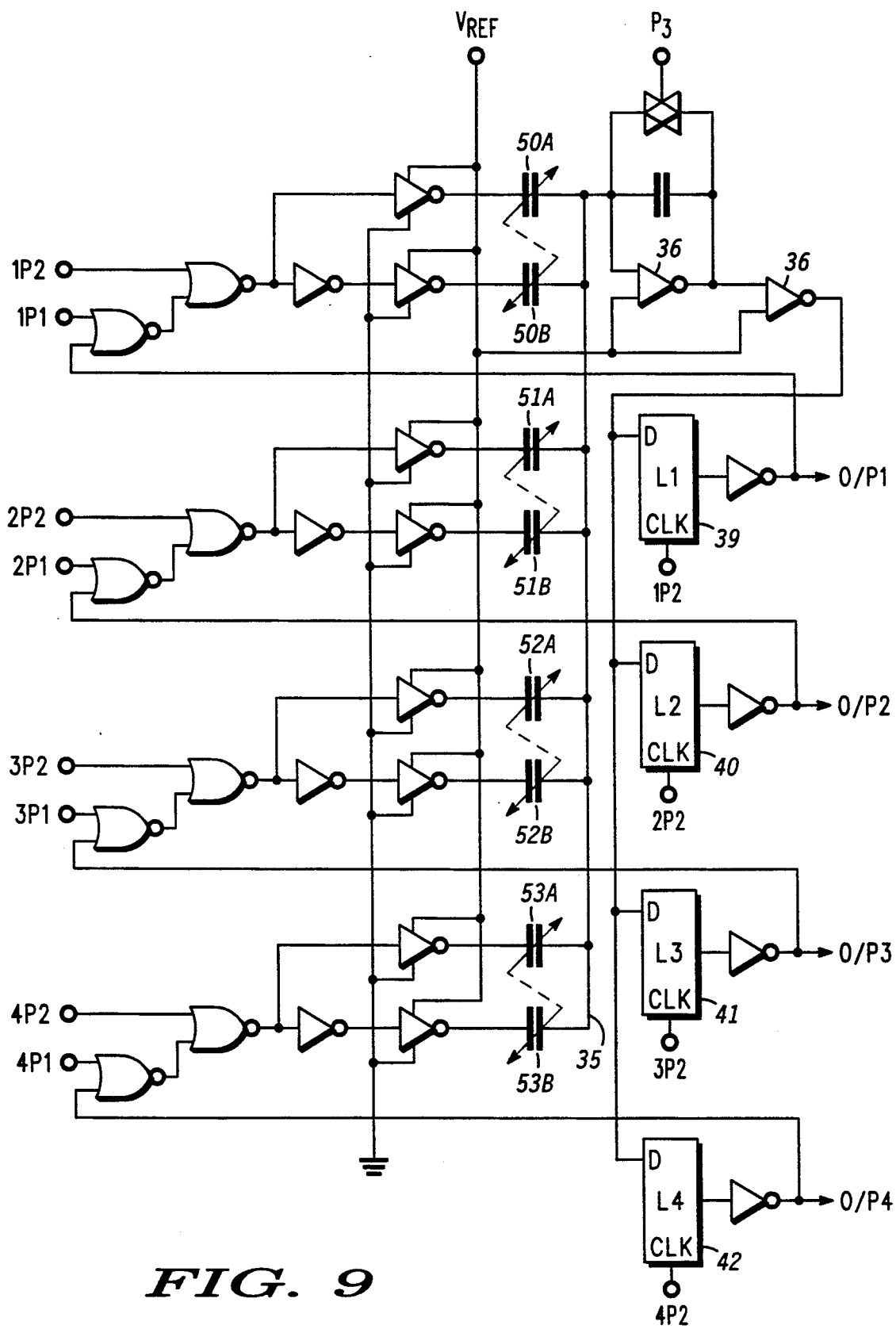
FIG. 9 is a schematic diagram of a sensing and control circuit electrically attached to the two axis gyroscope of FIG. 2, the function of which is incorporated into the MPU.

FIG. 9 illustrates a schematic diagram of a sensing and control circuit electrically attached to gyroscope 24 of FIG. 2. While the sensing and control circuit is illustrated as a separate circuit, and in fact could be so integrated onto chip 22 if desired, it will be understood by those skilled in the art that in this specific embodiment it is simply for purposes of explanation and the functions of the circuit are incorporated into MPU 30.

Central post 35 and rotor 32 of gyroscope 24 is designated node 35 in FIG. 9 and sensing and control signals are applied to the capacitive plates 50A-53B via the logic components illustrated. Any difference in capacitance between the capacitances formed by capacitive plates 50A and 50B will result in a charge on node 35, which is amplified, inverted and converted into a voltage by amplifier 36. In latch circuit 39, a positive voltage is latched as a high and a negative voltage is latched as a low. The output signal from latch circuit 39 is fed back via logic gates to inverters, which apply $V_{REF}$ and ground to capacitive plates 50A and 50B. $V_{REF}$ and ground potentials are applied to capacitive plates 50A and 50B to generate an electrostatic force in the quadrant, which is applied to rotor 32 to force it and maintain it in its central position. Thus, each set of capacitive plates is sampled and corrective action taken in each section to centralize the position of rotor 32.

Using MPU 30, or other special custom logic not shown, latch circuits 39-42 are sampled and the average high and low driving periods are compared over extended time periods. It should be noted that by measuring the time domain (against an MPU crystal for example) very accurate measurements can be made and, over extended periods of time using digital methods, very wide dynamic ranges can be measured, giving accurate measuring and a very sensitive device.

Referring specifically to FIGS. 5 and 6, an embodiment of the vibration monolithic gyroscope 26, is illustrated. Substrate 20 has a mounting post 115 formed on a planar surface thereof and defining a first axis, which in this specific embodiment is the input axis. A generally rectangularly shaped seismic mass 120 is positioned in parallel spaced apart relationship above the planar surface of substrate 20. Mass 120 has a central opening 121 therethrough and is further positioned generally symmetrically about post 115. A pair of cantilever arms 122 are each affixed to post 115, at opposite sides thereof, by one end and the other end of each arm 122 is attached to the inner periphery of mass 120. Arms 122 define a second axis, orthogonal to the first axis, that in this embodiment is the axis about which gyroscope 26 is driven, or vibrated. A third axis is defined mutually perpendicular to both the first and second axes, which third axis is the output axis. It will of course be understood that arms 122 can be formed as a continuous sheet, or web, of material with appropriate openings therethrough for mounting and/or connecting the various components.

Two pairs of plates 125 are positioned on substrate 20, between substrate 20 and mass 120, one pair being positioned adjacent the outer end of each of the arms 122. The plates 125 are spaced apart on either side of the second axis and form capacitances C2 and C4 with mass 120 at each end of the second axis. Pits 127 are etched into substrate 20 under mass 120 to extend the distance that mass 120 can move before contacting substrate 20.

Two pairs of plates 129 are positioned above the upper major surface of mass 120, one pair being positioned adjacent the outer end of each of the arms 122. The plates 129 are spaced apart on either side of the second axis, generally in overlying relationship to the plates 125, and form capacitances C1 and C3 with mass 120 at each end of the second axis. Plates 129 are formed, for example (as illustrated in FIG. 3), by selectively depositing a third semiconductor layer over the second semiconductor layer or by forming a conventional crossover bridge.

Figure 12:
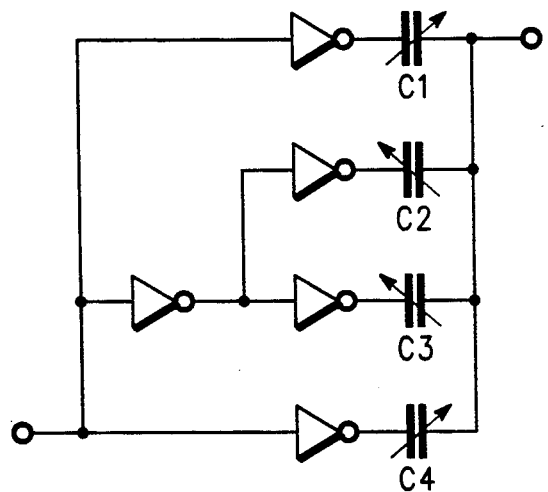
FIG. 12 illustrates a schematic diagram of a drive circuit for the gyroscope of FIG. 10.

Referring to FIG. 12, a schematic diagram of a driving circuit including capacitors C1-C4 is illustrated. In the circuit illustrated, capacitors C1 and C4 are connected to receive an inverted drive signal and capacitors C2 and C3 are connected to receive the drive signal directly (twice inverted for timing and buffering). The drive signal consists of alternating pulses of energy. Since capacitors C1-C4 are connected so that diametrically opposed capacitors have the same signal, mass 120 is vibrated, or oscillated (in this embodiment, at its natural resonant frequency), about the second axis when the alternating pulses are applied to the capacitors. The capacitors are used to monitor the amplitude of each vibration or oscillation and maintain the oscillations constant.

Figure 13:
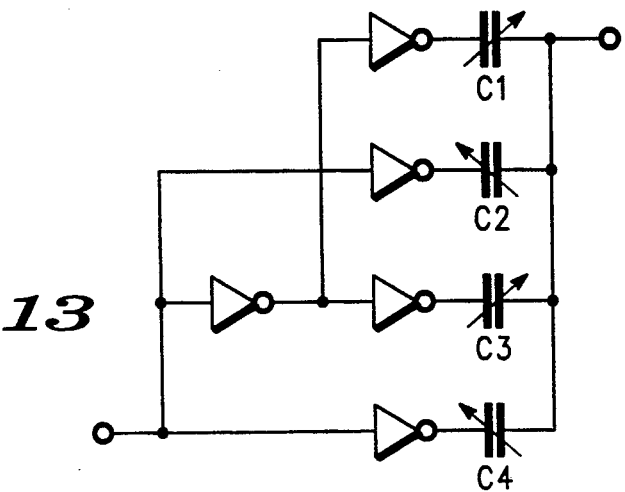
FIG. 13 illustrates a schematic diagram of a centering and sensing circuit for the gyroscope of FIG. 10.

Referring to FIG. 13, a schematic diagram of a centering and sensing circuit including capacitors C1-C4 is illustrated. In the circuit illustrated, capacitors C1 and C3 are connected to receive a centering and/or sensing signal directly (twice inverted for timing and buffering) and capacitors C2 and C4 are connected to receive an inverted centering and/or sensing signal. In this mode of closed loop operation, capacitors below mass 120 are connected in parallel and capacitors above mass 120 are connected in parallel. By connecting the capacitors in this fashion there is greater sensing capability and uniform centering force.

In the operation of gyroscope 26, capacitors C1-C4 at each end of mass 120 are time shared in the two modes illustrated in FIGS. 7 and 8. In the first mode capacitors C1-C4 are connected as illustrated in FIG. 12 and a vibratory, or oscillatory, motion is imparted to mass 120 about the second axis, defined by arms 122. Periodically capacitors C1-C4 are switched into the sensing mode. If gyroscope 26 is rotated about the first axis, defined by post 115, the Coriolis, or gyroscopic effect, causes vibration of mass 120 about the third axis. This vibration results in substantially equal changes in capacitances C1, C3 and equal changes in capacitances C2, C4 at each end of mass 120. The changes in the capacitances are sensed and converted to a signal representative of the measured rotation rate of gyroscope 26. A drive signal, which is generated by the sensed vibration, is then applied to the circuit illustrated in FIG. 13 as a closed loop signal to urge mass 120 toward center.

Figure 10:
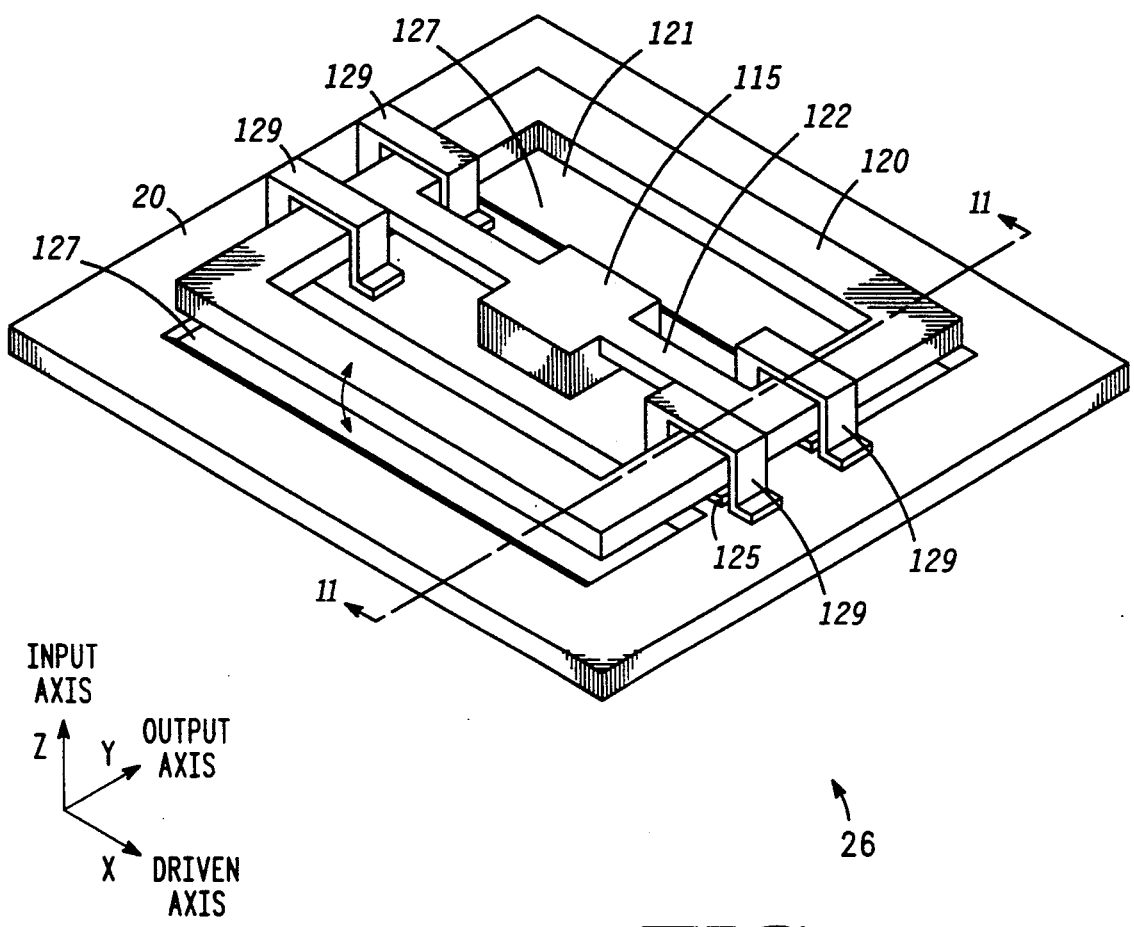
FIG. 10 is an enlarged view in perspective of the single axis vibration monolithic gyroscope of FIG. 1.
Figure 11:
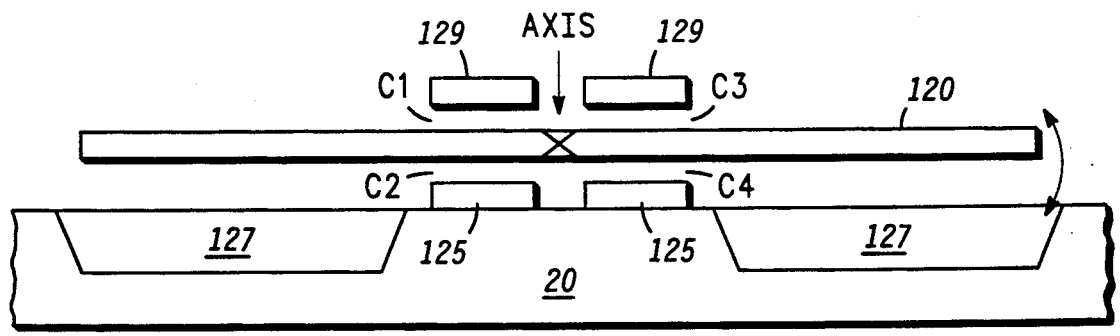
FIG. 11 is a sectional view of the gyroscope of FIG. 10 as seen along the line 11—11.
Figure 14:
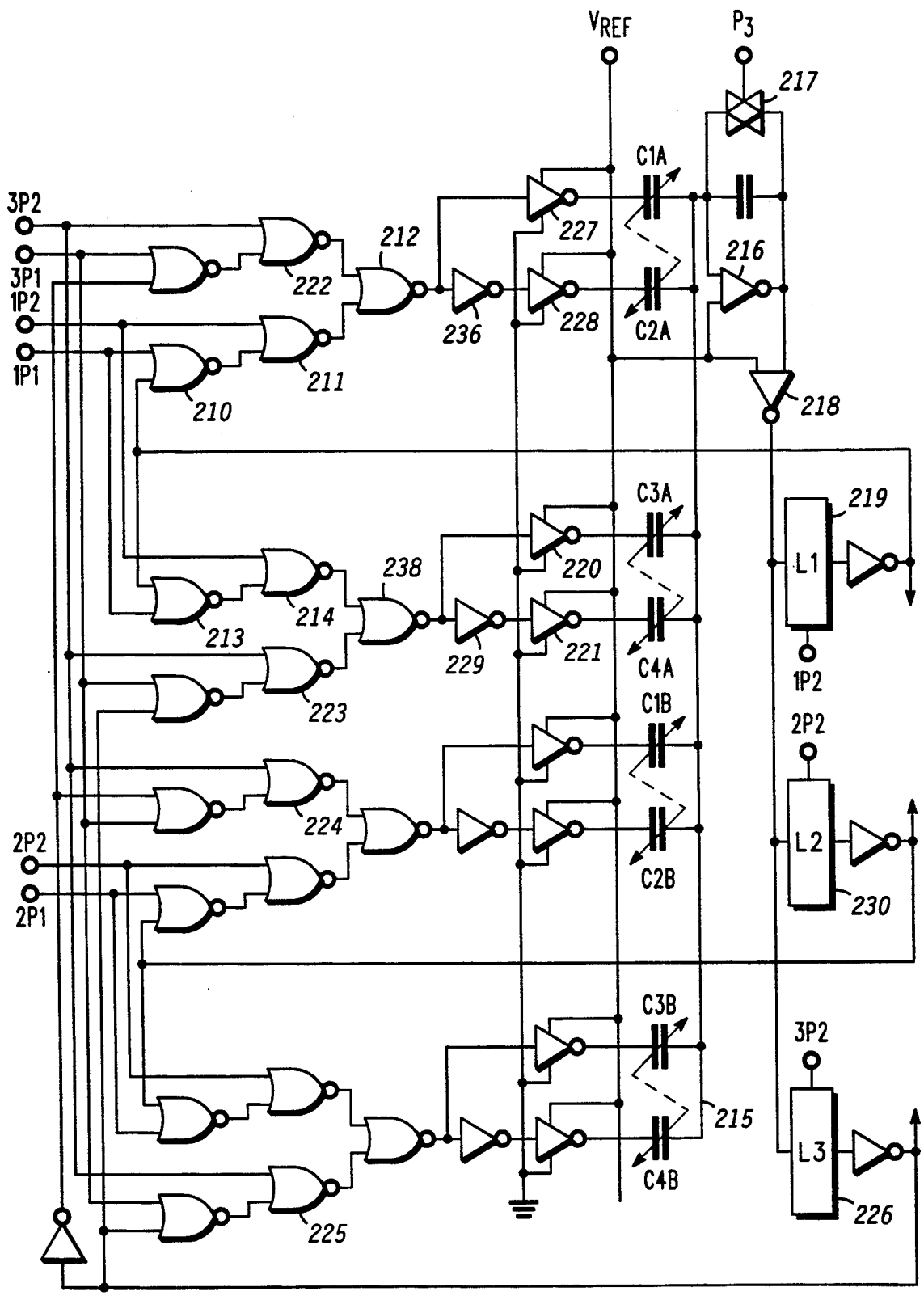
FIG. 14 is a schematic diagram of a sensing and control circuit for the gyroscope illustrated in FIG. 10, the function of which is incorporated into the MPU.
Figure 15:
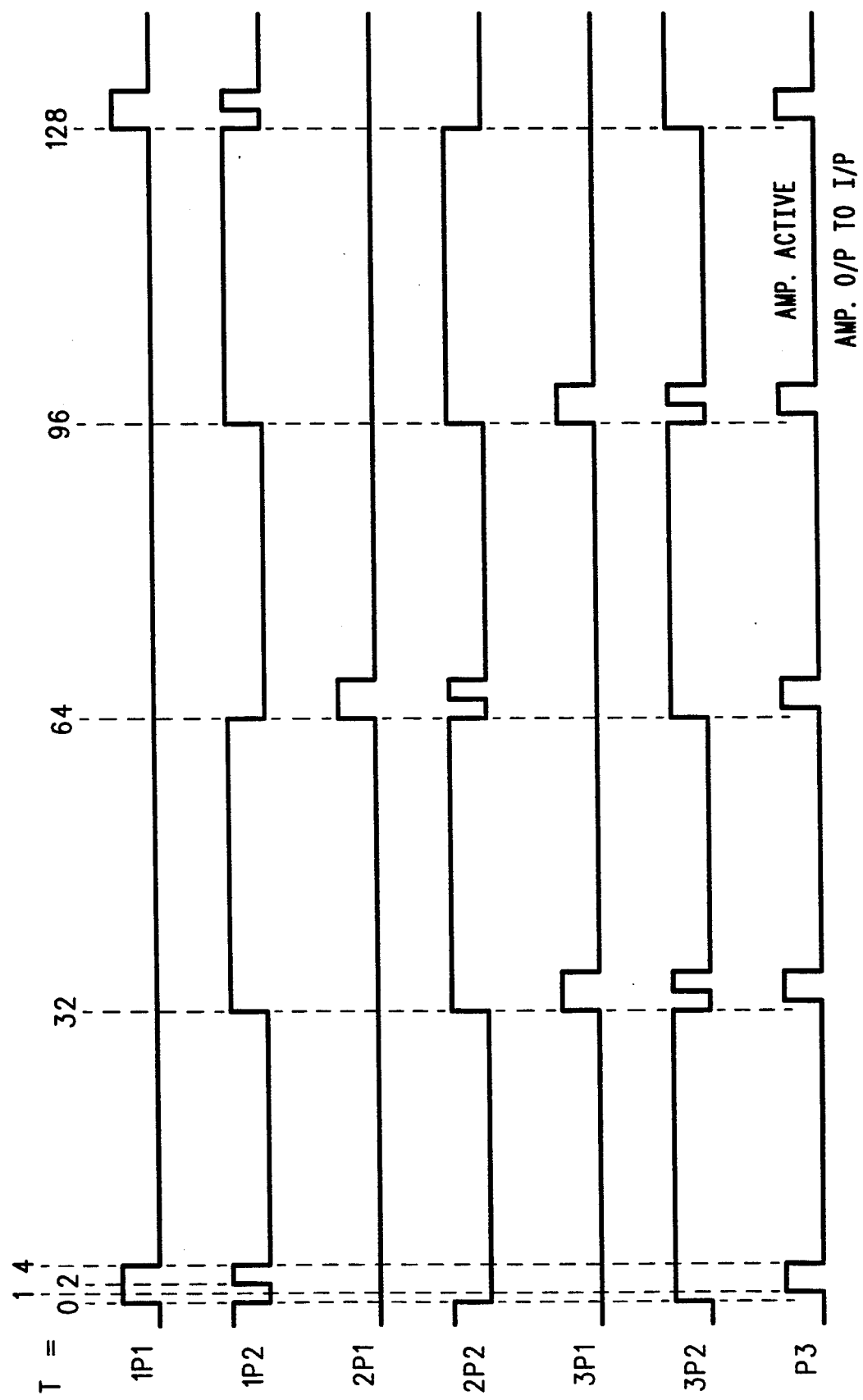
FIG. 15 illustrates waveforms available at various points in the schematic diagram of FIG. 14.

FIG. 14 illustrates a schematic diagram of a sensing and control circuit connected to gyroscope 26 of FIG. 10 and FIG. 15 illustrates waveforms available at various points therein. For the convenience of describing FIGS. 9 and 10, the capacitors formed at one end of mass 120 are designated C1A-C4A and the capacitors formed at the other end of mass 120 are designated C1B-C4B. Mass 120, or the central plate of each of the pairs of capacitors is designated node 215 in FIG. 14 with signals being connected to the upper and lower capacitive plates of each of the capacitors via the logic shown. At time T=0 (FIG. 15), the capacitors are switched to the configuration shown in FIG. 13, input terminal 1P1 goes high, forcing VREF voltage on the upper plates of capacitors C1A and C3A and ground potential on the lower plates of capacitors C2A and C4A. The center plate, node 215, is held at $V_{REF}$ by a virtual ground amplifier 216, which has unity gain due to a switch 217 being closed by a low signal P3 on the control input terminal thereof.

At time T=1, P3 is driven high and switch 217 is turned off so that amplifier 216 becomes active as a virtual ground integrating amplifier. At time T=2, input terminal 1P2 is switched from low to high, which forces the voltage on the upper plates of capacitors C1A and C3A to switch from $V_{REF}$ to ground potential and the voltage on the lower plates of capacitors C2A and C4A to switch from ground potential to $V_{REF}$. Any difference in capacitance between C1A+C3A and C2A+C4A results in a charge on node 215 which is amplified, inverted and converted into a voltage by amplifier 216.

At time T=4, after the amplifiers have had time to settle, the signal is latched by a latch circuit 219. Latch circuit 219 is a negative edge triggered latch clocked by signals on input terminal 1P2, which latches positive voltage signals as a "high" and negative voltage signals as a "low". The output from latch circuit 219 is fed back via gates 210, 211, 212, 213, 214 and 235 to inverters 236, 227, 228, 229, 220 and 221 which apply VREF and ground potential to the plates of capacitors C1A, C2A, C3A and C4A. By applying $V_{REF}$ and ground potential as described above, the same potential is applied to plates C1A and C3A and the same potential is applied to plates C2A and C4A so that an electrostatic force is produced on the center plate, mass 120, to pull and hold mass 120 in its central position. The electrostatic force is produced on mass 120 in this section from time T=4 to T=32 and again from T=64 to T=96. The position of mass 120 is again sampled in this section when T=128. At times T=64, 192, etc. capacitors C1B+C3B and C2B+C4B are sampled and during times T=64 to 96 and 128 to 160 the corrective electrostatic force is produced to center mass 120 at the other end of mass 120.

Over extended periods of time, up to one second, the time duration of the corrective electrostatic force on the capacitor plates at end A of mass 120 is compared to the corrective electrostatic force at end B of mass 120. It should be noted that these signals are AC, being modulated by the vibration frequency of mass 120, so that the signals have to be demodulated and then compared. This comparison gives the rate of rotation. Maximum sensitivity is achieved by the close spacing between the sensing plates and the optimized spacing between the sets of capacitors.

In this specific embodiment, oscillation or vibration of mass 120 about the X axis, defined by arms 122, is accomplished as follows. During time periods T=0 to 32, 64 to 96, 128 to 160, etc.,the signal on input terminal 3P2, connected to gates 222, 223, 224 and 225 is high. This high signal inhibits signals from latch circuit 226 controlling or driving the capacitor plates and, simultaneously, allows signals from latch circuits 219 and 230 to sense and control mass 120. During times T=32 to 64, 96 to 128, etc., signals on input terminals 1P2 and 2P2 are high, inhibiting signals from latch circuits 219 and 230 being applied to the capacitors. Thus, during these times the capacitors are driven from latch circuit 226.

During time periods R=32 to 64, 96 to 128, etc. the configuration is electronically switched to that illustrated in FIG. 12, the angular position of mass 120 is sensed at the start of each cycle by measuring the differential capacitance between C1A+C4A+C1B+C4B and C2A+C3A+C2B+C3B. Mass 120 is then driven by electrostatic forces by applying the appropriate voltages to the upper and lower capacitor plates to force the mass into oscillation. For example, rotation about the axis through arms 122 (the X axis) is sensed. Mass 120 is driven in one direction until a predetermined difference in capacitance is sensed, then latch circuit 219 is triggered and the drive voltages on mass 120 are reversed and mass 120 is driven in the opposite direction until a predetermined capacitance is sensed. Using this method of drive, mass 120 is made to oscillate or vibrate about the X axis at the natural resonant frequency of the structure, with a fixed amplitude of oscillation. Consequently, mass 120 is driven at resonance, any Coriolis forces produced by rotation of gyroscope 26 about the Z axis is measured and mass 120 is maintained substantially in its centered position by multiplexing the drive signals to the four pairs of sensing capacitors.

Figure 16:
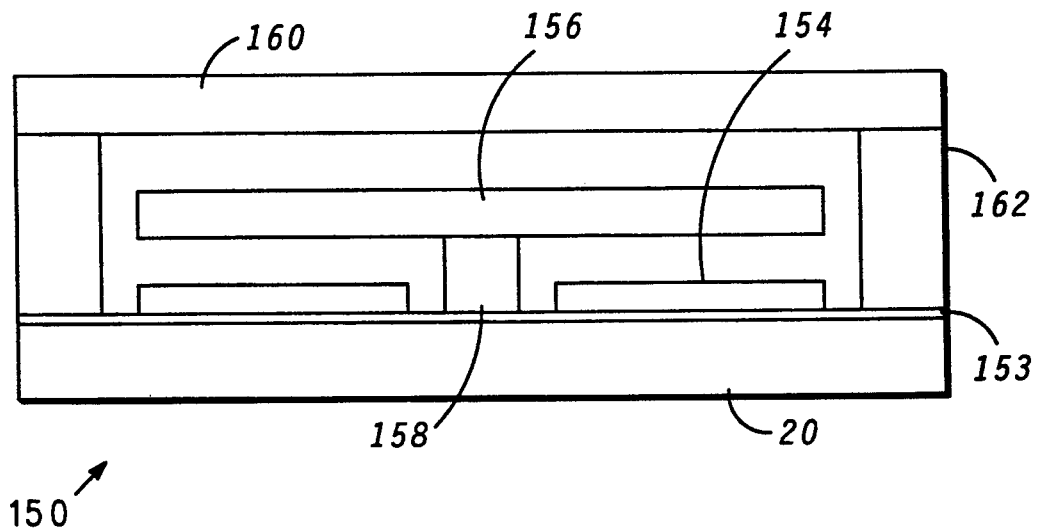
FIG. 16 is a simplified cross-sectional view of the three axes accelerometer of FIG. 1, illustrating the relationship of the various components.

FIGS. 16, 17, 18, 19 and 20 illustrate an embodiment of a three axis accelerometer 28 in more detail. Referring specifically to FIG. 16, it can be seen that accelerometer 28 is formed on substrate 20 and includes a first conductive layer 154 supported on the planar surface of substrate 20. A second conductive layer 156 is supported on a centrally positioned post 158, which is in turn supported on substrate 20. Layer 156 is positioned in overlying, spaced relationship relative to layer 154 and is movable with relation thereto, as will be explained presently. A third conductive layer 160 is fixedly positioned in spaced apart overlying relationship, relative to layer 156, by means of pillars 162 extending from the outer periphery of layer 160 to substrate 20. The various layers are formed by well known micromachining techniques and by the use of sacrificial layers, as explained above, and will not be described further.

Figure 17:
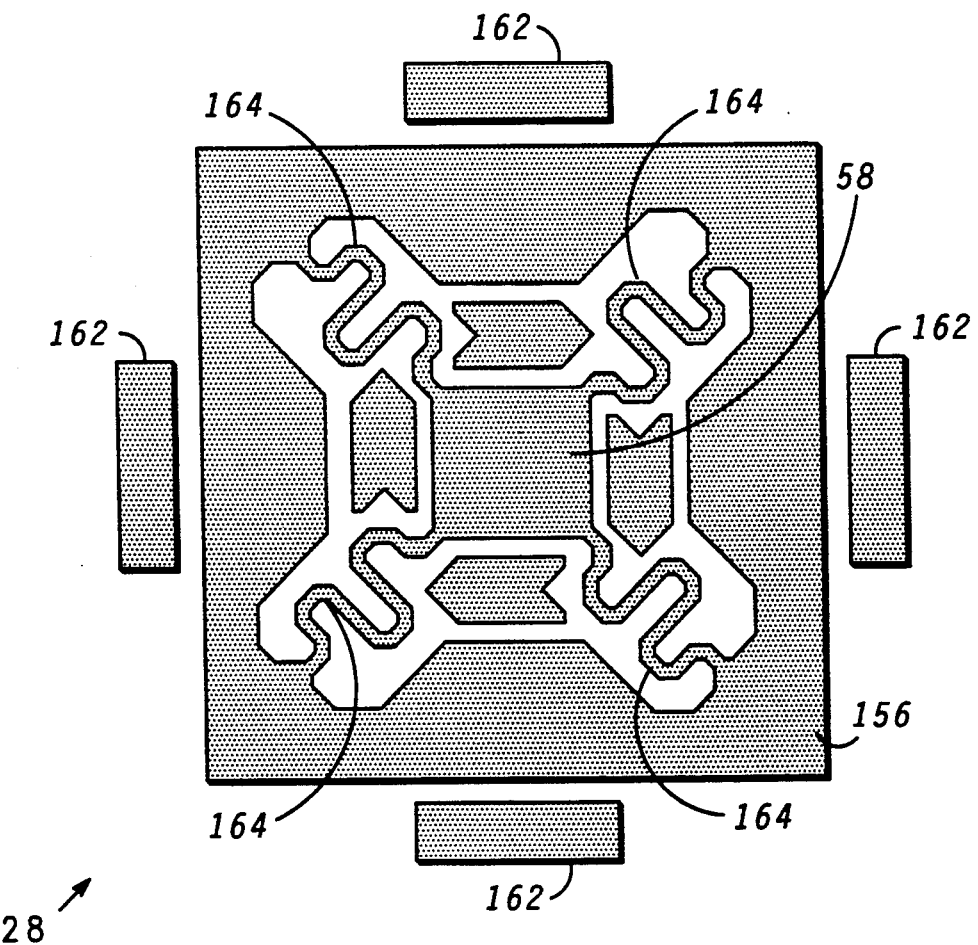
FIG. 17 is an enlarged view in top plan of the three axis accelerometer of FIG. 16.

FIG. 17 is a view in top plan of layer 156, with pillars 162 illustrated in section to show the relative position thereof. Layer 156 is a generally square, planar mass affixed to central mounting post 158 by means of four arms 164. Arms 164 are formed with a sinuous central portion that provides a spring-like action to allow movement of layer 156 in any direction relative to mounting post 158. Layer 160 includes four generally rectangular conducting plates 166 each having two truncated corners to coincide with similarly shaped portions of layer 156. Each of the plates 166 cooperates with layer 156 to form a capacitance 167A-167D, respectively (see FIG. 19), and similar plates in layer 154 cooperate with layer 156 to form capacitances 168A-168D (see FIG. 19). Two of the plates 166 are positioned to define the Y axis while the remaining two plates 166 are positioned to define the X axis. The Z axis is defined by layers 154, 156 and 160 and is perpendicular to the surface of substrate 20. Thus, three mutually orthogonal axes are defined and the capacitors 167A-167D and 168A-168D are positioned to sense acceleration therealong.

Figure 18:
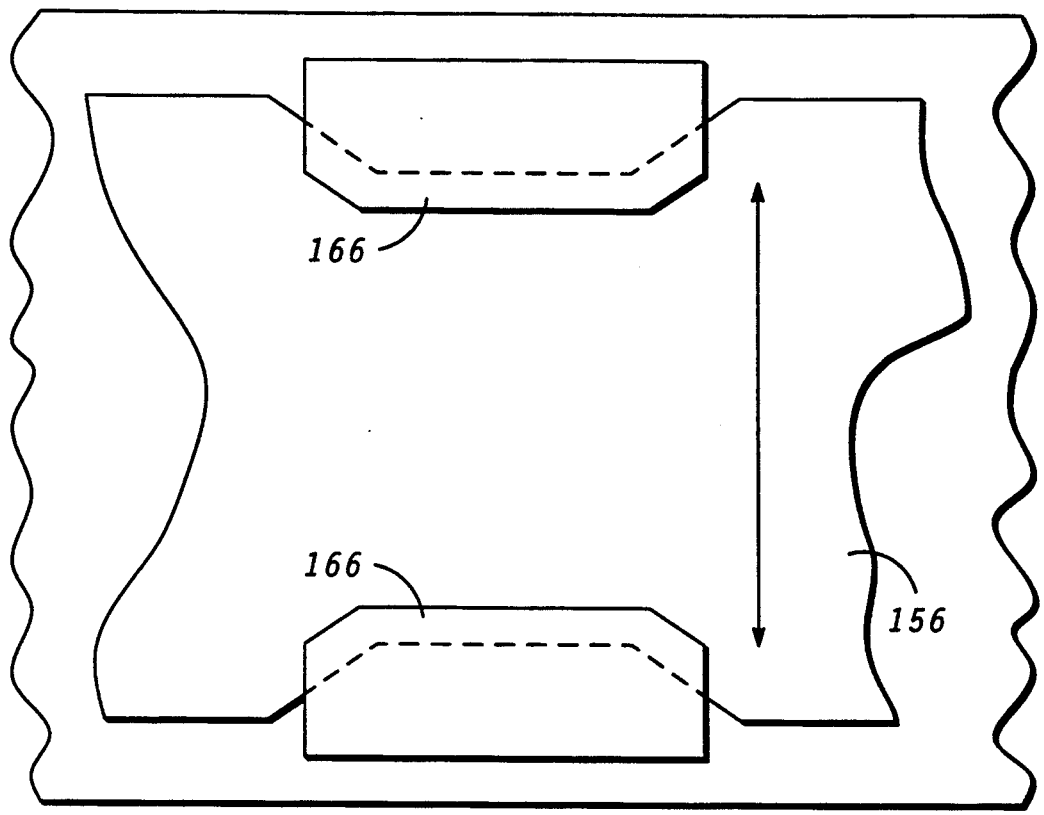
FIG. 18 is a greatly enlarged view in top plan of a portion of the accelerometer illustrated in FIG. 16.
Figure 19:
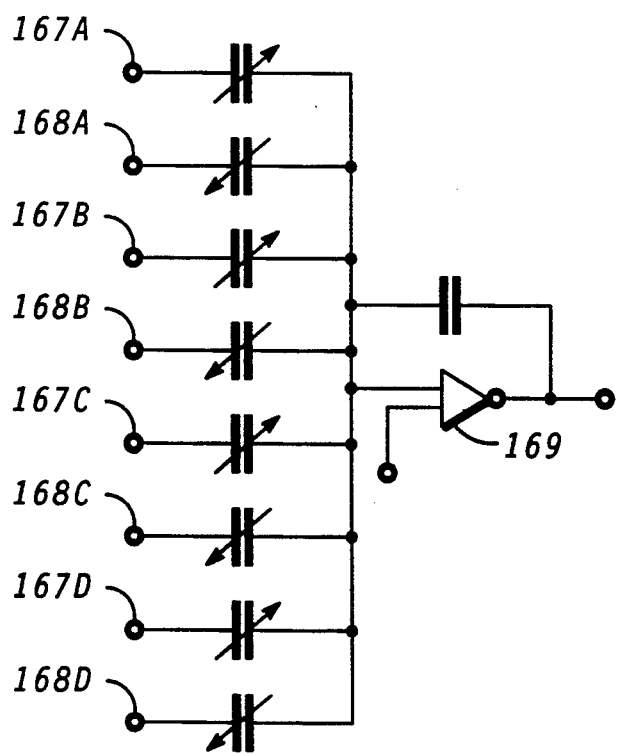
FIG. 19 is a schematic representation of the sensing apparatus of the accelerometer illustrated in FIG. 16.

FIG. 18 is a greatly enlarged view in top plan of portions of layer 156 and plates 166 (designated 166A and 166B for convenience), illustrating in more detail the manner in which capacitances 167B and 167D are varied. As an acceleration force along the X axis causes layer 156 to move in the direction of the top of FIG. 18, more of plate 166b overlies layer 156 causing capacitance 167B to increase. Also less of plate 166D overlies layer 156, causing capacitance 166D to decrease. Similarly, capacitances 168B and 168D, between layer 156 and layer 154 will increase and decrease, respectively. Thus, capacitances 167B, 167D, 168B and 168D are used in a differential electronic circuit to sense the acceleration along the X axis. Similarly, capacitances 167A, 167C, 168A and 168C are used to sense the acceleration along the Y axis. FIG. 19 illustrates capacitances 167A-167D and 168A-168D connected to a comparator 169 in a typical sensing circuit. Comparator 169 compares the input signal received from the capacitances to a reference signal to determine any change in capacitance.

Figure 20:
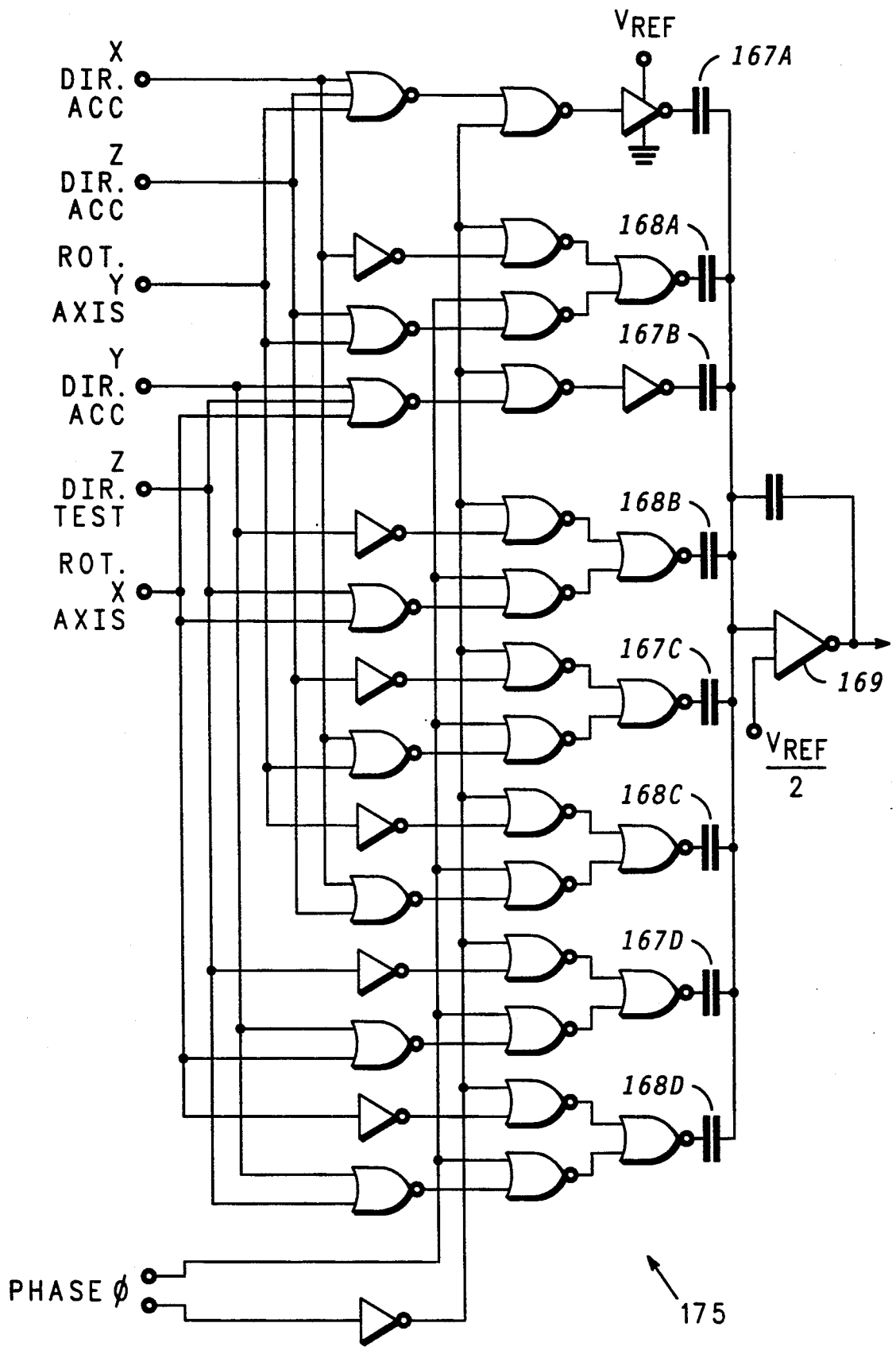
FIG. 20 is a schematic diagram of a driving circuit for the accelerometer of FIG. 16, including the sensing apparatus of FIG. 19, the function of which is incorporated into the MPU.

Referring to FIG. 20, a switching, or driving, circuit 175 is illustrated, including the sensing circuit of FIG. 19. By sensing changes in various capacitances, the following functions can be performed:

| FUNCTION | CAPACITANCES DRIVEN |
|---|---|
| acceleration in X direction | 167A + 168A vs 167C + 168C |
| acceleration in Y direction | 167B + 168B vs 167D + 168D |
| acceleration in Z direction | 167A = 167C vs 168A + 168C |
| self-test in Z direction | 167B = 167D or 168B + 168D |
| rotation accel. about X axis | 167B + 168D vs 167D + 168B |
| rotation accel. about Y axis | 167A + 168C vs 168A + 167C |

Switching circuit 175 connects the various capacitances into any of the relationships designated above to make the desired measurement and comparator 169 compares the input signal from the capacitances to a reference signal. In this fashion acceleration along three mutually orthogonal axes is measured, rotation acceleration about two of the axes can be measured and at least a portion of the accelerometer and associated circuitry can be tested.

Figure 21:
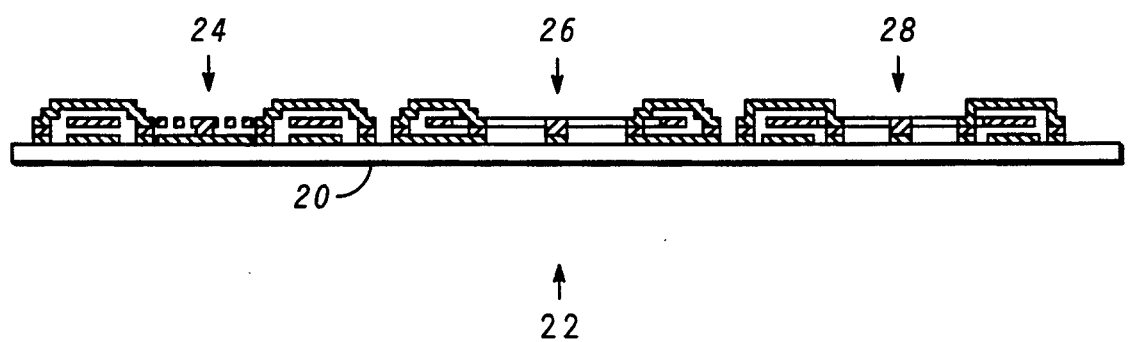
FIG. 21 is an enlarged cross-sectional view of gyroscopes positioned to sense Coriolis forces about three orthogonal axes and a three axis accelerometer integrated into associated electronics in accordance with the present invention.

Referring to FIG. 21, an integrated circuit 180 is illustrated wherein multi-axes gyroscope 24, gyroscope 26 and three axis accelerometer 28, constructed in accordance with the present invention, are formed on substrate 20. Also formed on substrate 20 is circuitry used with the gyroscopes and accelerometer to produce signals representative of rotation about the three orthogonal axes and acceleration along the three orthogonal axes. Further, the circuitry includes all of the closed loop components utilized to produce vibration and to maintain the movable parts of the various devices in an approximately centered position. Also, the circuitry includes one or more EPROMs or EEPROMs and circuitry for measuring the ambient temperature of the chip so that automatic temperature calibration of the various functions is continuously performed. In this specific embodiment the circuitry also includes circuits which utilize the rotation and acceleration measurements to provide a continuous indication of the position of inertial guidance system 22. Circuits which might be conveniently utilized for the above specified purposes are, for example, microprocessor 30 or the like. The entire inertial guidance system 22 could be encapsulated by means of an upper layer that includes the uppermost layer of each of gyroscopes 24 and 26 and accelerometer 28. Also, the encapsulation layer could be a second substrate having a cavity etched into the lower surface to receive the two gyroscopes and the accelerometer therein and the circuitry, including MPU 30, could be partially or completely formed on a surface thereof.

Thus, a complete inertial navigation system, or any sub-part thereof, formed on a single substrate is disclosed. Because the various components are all formed on the same chip, the overall size of the system is greatly reduced and the cost is substantially reduced. By including all of the system on a single chip the chip to chip capacitance is greatly reduced which substantially improves the sensitivity and reduces noise and other interference. This integration also protects the structures and circuits from electrostatic discharges during handling and also from RFI and EMI. Also, less capacitance means that less drive and power are required. An additional advantage is realized in calibration of the sensitivities of the various functions over temperature using E/EEPROMs in the MPU with on-board temperature monitoring.

While I have shown and described specific embodiments of the present invention, further modifications and improvements will occur to those skilled in the art. I desire it to be understood, therefore, that this invention is not limited to the particular forms shown and I intend in the append claims to cover all modifications that do not depart from the spirit and scope of this invention.

What is claimed is:

1. An inertial guidance system comprising gyroscopic apparatus providing three gyroscopic outputs, each of the three gyroscopic outputs being indicative of rotational movement of the system about a different one of three mutually orthogonal axes, the apparatus being formed on a semiconductor substrate, and control circuitry formed on the same semiconductor substrate and electrically connected to the gyroscopic apparatus for controlling the gyroscopic apparatus and receiving the three gyroscopic outputs.

2. An inertial guidance system as claimed in claim 1 including in addition accelerometer apparatus formed on the single substrate and providing three acceleration outputs, each of the three acceleration outputs being indicative of acceleration along a different one of three mutually orthogonal axes.

3. An inertial guidance system as claimed in claim 2 including in addition control apparatus electrically connected to the accelerometer apparatus and formed on the single semiconductor substrate.

4. An inertial guidance system as claimed in claim 2 wherein the accelerometer apparatus is a single three axis accelerometer.

5. An inertial guidance system as claimed in claim 2 wherein the three mutually orthogonal axes along which the accelerometer apparatus provides acceleration outputs are the same three mutually orthogonal axes about which the gyroscopic apparatus provides gyroscopic outputs.

6. An inertial guidance system comprising:
a semiconductor substrate;
rotational vibration gyroscope apparatus formed on the substrate and providing gyroscopic outputs about three mutually orthogonal axes, the gyroscopic apparatus including a single, substantially centrally located mounting post fixedly attached to a base and defining a first axis, a mass positioned in and defining a plane perpendicular to the post, helical springs affixed at one end to the post and at another end to the mass, and mounting the mass for oscillatory rotary movement about the post, oscillatory motion driving apparatus mounted adjacent to the mass for causing the mass to move in an oscillatory rotary motion about the first axis, and sensing apparatus, positioned adjacent to the mass and defining second and third axes mutually perpendicular to each other and to the first axis, for sensing movement of the mass about the third axis in response to movement of the gyroscope about the second axis and for sensing movement of the mass about the second axis in response to movement of the gyroscope about the third axis; and
control circuitry formed on the same semiconductor substrate and electrically connected to the gyroscopic apparatus for controlling the gyroscopic apparatus and receiving the gyroscopic outputs.

7. An inertial guidance system as claimed in claim 6 wherein the base includes a substrate with a generally planar upper surface and the mass is a generally disk shaped layer of semiconductor material lying in and defining the plane, the plane further being parallel to and spaced from the planar upper surface of the substrate.

8. An inertial guidance system as claimed in claim 7 wherein the sensing apparatus includes first plates positioned in parallel to and adjacent the mass for sensing movement about the third axis in response to movement of the gyroscope about the second axis and second plates positioned in parallel to and adjacent the mass for sensing movement about the second axis in response to movement of the gyroscope about the third axis.

9. An inertial guidance system comprising:
a semiconductor substrate;
a three axis accelerometer formed on the substrate and including a plurality of layers of conductive material each generally defining a plane and each mounted so the defined planes are parallel with and in spaced relation to each other, a first of the layers being fixedly mounted and with a second layer being mounted for limited movement relative to the first layer, the first and second layers forming a first capacitance varying in accordance with acceleration of the accelerometer along a first axis defined by the first and second layers, first and second structures formed as a portion of the first and the second layers, respectively, and positioned in parallel justaposition, the second structures being moveable with the second layer and relative to the first layer, the first and second structures being further formed to define second and third axes mutually orthogonal with each other and the first axis, and variable capacitances being formed between the first and second structures, which capacitances vary in accordance with acceleration in the second and third axes, respectively; and
control electronics formed on the substrate and connected to the three axis accelerometer for control and operation thereof.

10. An inertial guidance system comprising gyroscopic apparatus providing gyroscopic outputs about three mutually orthogonal axes and acceleration sensing apparatus providing acceleration outputs along three mutually orthogonal axes, the gyroscopic and acceleration sensing apparatus being formed on a single semiconductor substrate, and control circuitry formed on the same semiconductor substrate and electrically connected to the gyroscopic and acceleration sensing apparatus for controlling the gyroscopic and acceleration sensing apparatus and receiving the gyroscopic and acceleration outputs.

11. An inertial guidance system as claimed in claim 10 wherein the control circuitry includes temperature measuring apparatus and circuitry coupled to the gyroscopic apparatus and the acceleration sensing apparatus for temperature calibration of substantially all functions of the gyroscopic apparatus and the acceleration sensing apparatus.

* * * * *